3,211,730
PROCESS FOR PREPARING HARDENABLE
CONDENSATION PRODUCTS
Ludwig Orthner, Frankfurt am Main, Karl Horst, Hofheim, Taunus, and Heino Wellens, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 30, 1963, Ser. No. 298,601
Claims priority, application Germany, Aug. 4, 1962,
F 37,531
13 Claims. (Cl. 260—248)

We have found that compounds that are particularly suitable for the improvement of fibrous materials such as textiles, paper, leather, or similar materials, can be prepared by reacting basic bistriazinones of the formula

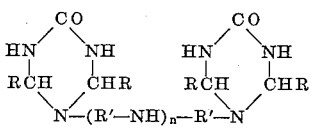

in which $n$ represents the integer 1 or 2, R represents hydrogen and/or low molecular alkyl radicals and R' represents low molecular alkyl radicals, preferably in the presence of a suitable solvent, simultaneously or consecutively, with two or more different aliphatic compounds each of which contains a long-chain aliphatic radical and one functional group capable of reacting with amino groups, and then reacting in known manner 1 mol of the reaction product obtained with 2 to 6 mols, preferably 3 to 5 mols, of an aliphatic aldehyde, preferably formaldehyde. If desired, the methylol groups can subsequently be etherified with alcohols according to known methods. To supplement the process, the tertiary amino groups can be quaternated prior to the reaction with aldehydes.

As polyamines which may be used as starting materials for the preparation of the bistriazinones, there enter into consideration, for example, diethylenetriamine, triethylenetetramine, diproplyenetriamine, tripropylenetetramine, bis-N,N'(γ-aminopropyl)-ethylenediamine.

The polyalkylene polyamines are transformed into bistriazinones in known manner by the reaction with dimethylol urea or with aldehyde and urea. The reaction can be effected at temperatures ranging from 20° C. to 100° C., preferably from 40° C. to 80° C., if required, in the presence of suitable diluents, for example, water, alcohols, or the like. The dimethylol urea or the aldehyde and urea are applied in a quantity permitting only two amino groups of the polyalkylene polyamine to be transformed into triazinone groups.

As long chain aliphatic compounds suitable for the further reaction, there enter into consideration those having at least 8, preferably 12 to 20, carbon atoms. These compounds, which may also be substituted, may be straight chain, branched chain compounds or compounds which are interrupted by aromatic, cycloaliphatic or heterocyclic radicals and/or hetero atoms, and they must contain a functional group capable of reacting with the free amino groups. Such reactive groups are, for example, the carboxylic acid halide group, the carboxylic acid azide group, the carboxylic acid ester group, the carbamic acid chloride group, the isocyanate group, the chlorocarbonic acid ester group as well as the N-methylolamide group, the N-methylol urethane group and the chloromethyl ether group.

The reaction of the two or more above-mentioned compounds with the bistriazinones can be carried out, depending on the nature of the reactive groups, either simultaneously or consecutively, in suitable solvents; for example, stearoyl chloride and palmitoyl chloride may be mixed and then reacted simultaneously at a temperature in the range of 0° C. and 40° C. with the basic bistriazinone in an aqueous, aqueous-alcoholic solution or with the addition of other solvents, for example, acetone, dimethylformamide, toluene, chlorobenzene, etc. Analogously, for example, octadecylisocyanate and tetradecylisocyanate as well as stearic acid methylol amide and palmitic acid methylol urethane may be used simultaneously.

When using, for example, stearic acid chloride and octadecyl isocyanate, it is advantageous first to react the bistriazinone in an aqueous-alcoholic solution at a pH of 7.5 to 9.5 and at a temperature in the range from 0° C. to 40° C., with the acid chloride and then to react the whole with the octadecylisocyanate at a temperature in the range from 30° C. to 70° C. However, it is also possible to use three or more of higher molecular reactive components.

For preparing the alkylol compounds or the alkylol ethers of these mixed products, formaldehyde in the usual commercial solution of 30 to 40% strength is preferably used; or, paraformaldehyde in a finely dispersed form may also be used. It is also possible to use other aldehydes, for example, acetaldehyde or glyoxal. 2 to 6 molecules, preferably 3 to 5 molecules, of aldehyde are used per 1 molecule of bistriazinone. The reaction is carried out at a temperature in the range of 20° C. to 100° C., preferably in the range of 40° C. to 80° C., and at a pH-value in the range of 6 and 10, preferably 8 and 9. The reaction requires 1 to 4 hours.

For some application purposes, it is advantageous to etherify the alkylol groups by known methods, for example, by a treatment with an excess of alcohol in a strongly acid medium.

For improving the solubility and the stability to salts, it may be of advantage to convert the bistriazones that have been reacted with the long chain aliphatic compounds totally or partially into quaternary compounds and only then to condense with aldehydes. For quaternization, there may be employed the usual quaternating agents such as halogenoalkyls, dialkyl-sulfates, halogenocarboxylic acids, etc. The reaction is effected in a manner as such known, for example, in an aqueous solution or suspension at temperatures in the range of 0° and 100° C., while maintaining a pH-value of between 6 and 10.

The products prepared according to the process of the present invention are obtained as solutions in water, alcohol or other solvents or mixtures or as aqueous emulsions or suspensions in the form of a paste. In an appropriate dilution, they are suitable for the finishing of textiles, especially for softening and for producing a flowing, pleasant handle of textiles of any kind; by using in the present invention more than one long-chain compound for the reaction with the basic bistriazinone, textile effects with varying properties can be produced.

The products of the present invention can be used together with the commercial anti-creasing and other high quality finishing agents.

The products of the present invention are applied by impregnation of the materials to be treated with an aqueous bath containing 0.2 to 4.0% of the products of the invention and, in addition to them, one of the known acid hardening catalysts, for example, magnesium chloride, zinc nitrate, ammonium chloride, diglycolic acid and the like, and, if required or desired, also other high quality finishing agents, for example dimethylol-ethylene urea, polymethylol-melamine, the ethers thereof and similar compounds, and then drying the material and fixing by a condensation process at a temperature in the range of 80° and 170° C., preferably 100° and 150° C.

Besides being useful with high quality finishing agents, the products of the present invention may be used together with any other textile impregnating agents, for example plastic latices, emulsions and solutions of polymers, and natural substances.

The following examples illustrate the invention but they are not intended to limit it thereto:

*Example 1*

103 g. of diethylenetriamine are added, in the course of 1½ hours at room temperature, while stirring, to a solution of 240 g. of dimethylol urea in 700 cc. of water. After the addition, the whole is stirred for 1 hour at 30° C. and for 2 hours at 60° C. 600 cc. of isopropanol are then added. 240 g. of stearic acid chloride are added, while stirring at 20° C. and in the course of 1½ hours, to the resulting mixture, while maintaining the pH at between 8.0 and 8.5 by means of a sodium hydroxide solution of 25% strength. After the dropwise addition, the whole is heated for ½ hour to 60° C. and 80 g. of octadecylisocyanate are added in the course of half an hour, again at a pH of between 8.0 and 8.5. The solution, which is clear when warm, is then stirred for 2 hours at 60° to 70° C. and after addition of 440 g. of a formaldehyde solution of 30% strength, stirring is continued for 2 hours at 60 to 70° C. After having been allowed to cool to 20° C., a soft wax-like mass is obtained which can be dissolved and gives a turbid solution in water.

*Example 2*

52 g. of diethylenetriamine are added in the course of half an hour at room temperature to the solution of 120 g. of dimethylol urea in 300 cc. of water. After the addition, the whole is stirred for 1 hour at 30° C. and for 2 hours at 60° C. 400 cc. of ethanol are then added and a mixture of 75 g. of stearic acid chloride and 70 g. of oleic acid chloride is run in, while stirring, in the course of 1½ hours at 30° C. and at pH 8.5. After the addition stirring is continued for 1 hour at 30° C. and the whole is heated in the course of half an hour to 60° C., while maintaining the pH-value at 8.5 by means of a sodium hydroxide solution of 25% strength. 220 g. of a formaldehyde solution of 33% strength are added and the whole is then stirred for 1½ hours at 60° C. and pH 8.5. The resulting product gives a clear solution, even when cooled, and can be diluted with water without apparent turbidity.

We claim:

1. A process for preparing hardenable condensation products which comprises reacting a bistriazinone of the formula

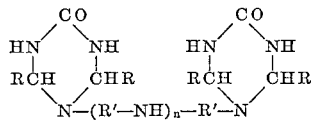

wherein $n$ represents an integer from 1 to 2, R represents a member selected from the group consisting of hydrogen and lower alkyl radicals and R' represents a lower alkyl radical, with at least two different aliphatic compounds each having an aliphatic radical of 8 to 20 carbon atoms and a functional group capable of reacting with a free amino group, said functional group being a member selected from the group consisting of carboxylic acid halide, isocyanate, carboxylic acid azide, carboxylic acid ester, carbamic acid chloride, chlorocarbonic acid ester, N-methylol amide, N-methylol urethane and chloromethyl ether, to form a condensation product and reacting 1 mol of said condensation product with 2.0 to 6.0 mols of a lower aliphatic aldehyde.

2. A process as defined in claim 1 wherein said different aliphatic compounds are reacted simultaneously with said bistriazinone.

3. A process as defined in claim 1 wherein said different aliphatic compounds are reacted consecutively with said bistriazinone.

4. A process as defined in claim 1 wherein said bistriazinone and said aliphatic compounds are reacted in a solvent.

5. A process as defined in claim 4 wherein said solvent is a member selected from the group consisting of water, organic solvents miscible with water, and solutions of said organic solvent and water.

6. A process as defined in claim 1 wherein said bistriazinone and said aliphatic compounds are reacted at a temperature in the range of about 0° to 70° C.

7. A process as defined in claim 1 wherein said condensation product and said aliphatic aldehyde are reacted at a temperature in the range of about 20° to 100° C.

8. The process as claimed in claim 1, wherein tertiary amino groups are quaternized prior to reacting said condensation product with said aliphatic aldehyde.

9. The process as claimed in claim 1, wherein 3.0 to 5.0 mols of said aliphatic aldehyde are used.

10. The process as claimed in claim 1 wherein said aliphatic aldehyde is a member selected from the group consisting of formaldehyde, paraformaldehyde, acetaldehyde and glyoxal.

11. The process as claimed in claim 1, wherein after the reaction with said aliphatic aldehyde, methylol groups are etherified with an alcohol.

12. The process as claimed in claim 11 wherein an alcohol having up to 4 carbon atoms is used as an alcohol.

13. The process as claimed in claim 11, wherein said alcohol is methanol.

References Cited by the Examiner

UNITED STATES PATENTS 3,035,942   5/62   Cooke et al. _____ 260—248 X

WALTER A. MODANCE, *Primary Examiner.*